United States Patent
Li et al.

(10) Patent No.: US 9,086,925 B2
(45) Date of Patent: Jul. 21, 2015

(54) METHODS OF PROCESSING CORE SELECTION FOR APPLICATIONS ON MANYCORE PROCESSORS

(71) Applicant: NEC Laboratories America, Inc., Princeton, NJ (US)

(72) Inventors: Cheng-Hong Li, New Brunswick, NJ (US); Kunal Rao, Princeton, NJ (US); Srihari Cadambi, Princeton Junction, NJ (US); Rajat Phull, Monmouth Junction, NJ (US); Giuseppe Coviello, Plainsboro, NJ (US); Murugan Sankaradas, Dayton, NJ (US); Srimat Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 269 days.

(21) Appl. No.: 13/858,036

(22) Filed: Apr. 6, 2013

(65) Prior Publication Data

US 2014/0208331 A1     Jul. 24, 2014

Related U.S. Application Data

(60) Provisional application No. 61/761,985, filed on Feb. 7, 2013, provisional application No. 61/761,969, filed on Feb. 7, 2013, provisional application No. 61/754,371, filed on Jan. 18, 2013.

(51) Int. Cl.
*G06F 9/46* (2006.01)
*G06F 9/50* (2006.01)

(52) U.S. Cl.
CPC ............ *G06F 9/5044* (2013.01); *G06F 9/5033* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 5,872,972 | A * | 2/1999 | Boland et al. | 718/102 |
| 7,239,581 | B2 * | 7/2007 | Delgado et al. | 368/10 |
| 7,389,506 | B1 * | 6/2008 | Miller et al. | 718/1 |
| 8,051,418 | B1 * | 11/2011 | Dice | 718/102 |
| 8,336,056 | B1 * | 12/2012 | Gadir | 718/104 |
| 2004/0068730 | A1 * | 4/2004 | Miller et al. | 718/106 |
| 2005/0108713 | A1 * | 5/2005 | Geye et al. | 718/100 |
| 2006/0136915 | A1 * | 6/2006 | Aingaran et al. | 718/100 |
| 2008/0046895 | A1 * | 2/2008 | Dillenberger et al. | 718/105 |
| 2008/0126486 | A1 * | 5/2008 | Heist et al. | 709/205 |
| 2009/0031317 | A1 * | 1/2009 | Gopalan et al. | 718/103 |
| 2009/0031318 | A1 * | 1/2009 | Gopalan et al. | 718/103 |
| 2009/0037614 | A1 * | 2/2009 | Saripalli | 710/22 |
| 2009/0094437 | A1 * | 4/2009 | Fukuda | 712/28 |
| 2009/0164399 | A1 * | 6/2009 | Bell et al. | 706/25 |
| 2009/0187909 | A1 * | 7/2009 | Russell et al. | 718/102 |
| 2010/0077185 | A1 * | 3/2010 | Gopalan et al. | 712/220 |
| 2010/0257538 | A1 * | 10/2010 | Zhao et al. | 718/106 |
| 2011/0022870 | A1 * | 1/2011 | McGrane et al. | 713/340 |
| 2011/0107340 | A1 * | 5/2011 | Gupta et al. | 718/102 |
| 2012/0017217 | A1 * | 1/2012 | Umezawa et al. | 718/102 |

(Continued)

*Primary Examiner* — Emerson Puente
*Assistant Examiner* — Mehran Kamran
(74) *Attorney, Agent, or Firm* — Joseph Kolodka

(57) ABSTRACT

A runtime method is disclosed that dynamically sets up core containers and thread-to-core affinity for processes running on manycore coprocessors. The method is completely transparent to user applications and incurs low runtime overhead. The method is implemented within a user-space middleware that also performs scheduling and resource management for both offload and native applications using the manycore coprocessors.

4 Claims, 9 Drawing Sheets

(56) References Cited

U.S. PATENT DOCUMENTS

| | | | |
|---|---|---|---|
| 2012/0158967 A1* | 6/2012 | Sedayao et al. | 709/226 |
| 2012/0227045 A1* | 9/2012 | Knauth et al. | 718/100 |
| 2012/0284732 A1* | 11/2012 | Griglock et al. | 718/104 |
| 2013/0191837 A1* | 7/2013 | Abeles et al. | 718/104 |
| 2013/0297906 A1* | 11/2013 | Loh et al. | 711/167 |
| 2013/0346987 A1* | 12/2013 | Raney et al. | 718/102 |
| 2014/0317389 A1* | 10/2014 | Wenisch et al. | 712/229 |

* cited by examiner

```
while (new event) {
    if (there is a process to be scheduled) {
        /* Process scheduler: schedule a process in Process queue */
        schedule(Process_Queue,
                 firstFit(Memory Resource Limit),
                 aging_threshold);
    }
    For each MIC card {
        if (there is an offload to be scheduled) {
            /* Offload scheduler: schedule an offload in Offload queue */
            schedule(Offload_Queue,
                     firstFit(Thread Resource Limit),
                     aging_threshold);
        }
    }
}
```

FIG. 5A

METHODS OF PROCESSING CORE SELECTION FOR APPLICATIONS ON MANYCORE PROCESSORS

This application is a non-provisional of and claims priority to provisional applications with Ser. No. 61/754,371 filed on Jan. 18, 2013 and Ser. Nos. 61/761,969 and 61/761,985 both filed on Feb. 7, 2013, the contents of which are incorporated by reference.

BACKGROUND

The present application relates to multi-core processing.

A manycore processor provides a large number of processing cores that can support simultaneous executions of many multi-threaded processes. For example, Intel's Xeon Phi coprocessor has 60 processing cores that can execute 240 threads simultaneously. Each processing core supports 4 hardware thread contexts and has private, separate instruction and data L1 caches (32 KB each). Each core also hosts a 512 KB share of the L2 cache that is accessible to all cores. Every processing core also contains a 512-bit wide vector unit to support single-instruction-multiple-data (SIMD) operations. The on-chip interconnect linking the processing cores and the on-chip memory controllers is a ring. The coprocessor is connected to the host processor through PCIe bus.

The Xeon Phi coprocessor runs the Linux operating system to service the processes running on the coprocessor and manage the resources. Having an OS to manage the coprocessor eases the software development effort. For example, porting an existing application running on Linux and the x86 architecture to Xeon Phi usually only requires a recompilation of the source code with proper compiler flags. And as the standard Linux OS, the Xeon Phi's OS provides virtual memory system, file system, process control, scheduling, and naturally supports multiple processes to execute simultaneously on a Xeon Phi coprocessors.

One method of programming the Intel Xeon Phi coprocessor is to use the so-called offload programming model. In the offload programming model a programmer uses compiler pragmas to identify code sections that need to be executed on one or more Xeon Phi coprocessors. These code sections are called offload regions. In addition, a programmer specifies the input and the output data needed by offload regions. The compiler generates Xeon Phi instructions for the offload regions. The compiler also generates code that moves the input and output data of an offload region between the host processor's main memory and the Xeon Phi's device memory through the PCIe bus. At run time, a user program running on the host processor using the offload programming model automatically launches an offload process running on a Xeon Phi coprocessor. The offload process is responsible for the execution of offload regions and the data transfer between the host and the device memory.

To facilitate the development of highly parallel applications, Intel Xeon Phi's software stack also supports various parallel programming models like the popular OpenMP [17]. A programmer can implement an OpenMP code segment in an offload region. The OpenMP threads will be created by the offload process on the Xeon Phi coprocessor to execute the OpenMP code segment.

Many OpenMP applications benefit from thread-to-core bindings on these manycore processors. The thread-to-core bindings prevent the OS scheduler migrate a thread from one processing core to another. Therefore the binding of a thread to a processing core allows the thread to take advantage of the processing core's cache state that the thread has built up over time [10]. Xeon Phi's software stack provides several interfaces that allow such bindings to be applied to threads of a user process running on the coprocessor.

Although the Xeon Phi OS naturally supports simultaneous executions of multiple offload and native processes, the thread-to-core bindings of the concurrent processes very often lead to unbalanced workload across the processing cores. For example, two offload processes may both bind their threads to the same processing cores, while the rest of the processing cores remain idle. Unfortunately, it is almost impossible to have multiple, uncoordinated users set up the affinity bindings by themselves so the workload is spread across all processing cores as evenly as possible.

SUMMARY

In one aspect, a method is disclosed to manage a multi-processor system with one or more multiple-core processors by receiving a request for one or more cores to process a thread group. The process selects cores for the group of threads such that the number of selected cores previously used by the thread group is maximized by: selecting idle cores assigned to at least one earlier active phase of the thread group but not assigned to other existing thread groups; if more cores are needed, selecting cores that are idle and not currently assigned to any existing thread group; and if still more cores are needed, selecting cores that are idle but have already been assigned to other existing thread groups.

In another aspect, a runtime method is disclosed that dynamically sets up core containers and thread-to-core affinity for processes running on a multi-core processor. The method is completely transparent to user applications and incurs low runtime overhead. The method is implemented as a component within a resource manager and scheduler that manages the processes and thread groups of these processes.

Implementations of the above aspect can include one or more of the following. The method selects processing cores for a thread group whose constituent threads need to be coscheduled. The selection method may be used when a scheduler tries to schedule the thread group for execution. A thread group has one or more threads. These threads are created by a user process using a threading library, like OpenMP, and the user process may increase or decrease the number of threads in a thread group dynamically. The user process may run on a general-purpose computer or a coprocessor, such as Intel's Xeon Phi coprocessor. The threads in a thread group alternates between two phases: an active phase when the threads run on assigned processing cores, and inactive phase when the threads' executions are blocked. An active phase may end because the computation task is completed (e.g., all of the threads complete the execution of a function), or the threads' scheduling time quantum expires and the scheduler preempts the threads. On the other hand, a blocked thread group may be woken up by the scheduler and become active to execute a new task, or the scheduler decides to reschedule it. When the scheduler tries to schedule a thread group to run (to become active), the scheduler uses our method to select processing cores. When the thread group is blocked (inactive), the processing cores assigned to the thread group are released. The method restricts the number of threads that are in active phase running on a cluster of processing cores, which consists of a plural number of processing cores sharing certain physical computation resources like a cache. The number, called thread-to-cluster ratio, is configurable and reflects the limited amount of the resources shared by the same cluster of processing cores. As an example, on an Intel Xeon Phi processor a cluster has four processing cores sharing the same second-level cache and some computation units. Therefore using this ratio allows us to assign a proper number of threads to a cluster of processing cores, such that its hardware resources can be fully utilized but not oversubscribed.

The method uses user-specified thread-to-core affinity and the number of threads in a thread group to determine the number of processing cores for the thread group. Which thread-to-core affinity is best depends on the characteristics of an application. The method supports three types of thread affinity: compact, scatter and none. For compact affinity (the default setting), as few clusters of processing cores as necessary are used to host all threads without violating the thread-to-cluster ratio. For scatter affinity, the method uses as many clusters of processing cores as available so that each cluster has at least 1 thread while the thread-to-cluster ratio is respected. The "none" affinity setting uses as few clusters as necessary to host all threads without violating the thread-to-cluster ratio, but the threads are not bound to any specific processing core selected by the method.

As an example, consider a thread group of 120 threads. For compact and none affinity, the proposed method allocates 30 clusters of processing cores so that every cluster runs four threads (assuming a thread-to-cluster ratio of 4). Alternatively, for scatter affinity, 60 clusters are allocated. In both compact and balanced affinity settings, each thread is bound to a specific processing core in one of the selected clusters. On the other hand, in the "none" affinity setting each thread is not bound to any particular processing core, but can only run on the processing cores belonging to the selected clusters.

A processing core is idle if no thread is running on the core. Our core selection algorithm first attempts to allocate idle processing cores that were assigned to earlier active phases of the same thread group but not assigned to any other thread groups. If more processing cores are needed, then our method picks cores that are both idle and not currently assigned to any thread group. If still more cores are needed, then processing cores that are idle but have already been assigned to other thread groups, are chosen.

Several arrays track of the status of the processing cores. For all of the multicore/manycore processors in the same shared memory space, the disclosed method maintains a number of dictionary-type data structures that provide the status information of each processing core. Similarly, for each thread group, the disclosed method also maintains a number of data structures that tracks the processing cores that have been assigned to the previous active phase of the same thread group.

In another aspect, a server populated with multiple core coprocessor includes a manager to control user processes containing offload blocks by intercepting COI API calls and schedules user processes to run on one of the Xeon Phi coprocessors in accordance with the above aspect; and binds threads of offloads to specific cores within one of the Xeon Phi coprocessors by selecting and allocating cores to an offload, and obtaining the thread-to-core mapping from the user.

Implementations of the above system can
Employs an aging-based first-fit algorithm for process and offload scheduling
Uses thread and memory over-scheduling factors to enhance performance
Employs an algorithm for core selection such that offloads from the same process get preference to use the same cores
Use of efficient data structures to enhance the performance of core selection algorithm
The messaging between various components of COSMIC Advantages of the above system may include one or more of the following. The system assigns processing core resources to a plural of multithreaded user processes on a multicore or manycore processor such that all of the threads in a user process can be scheduled simultaneously to make good progress (coscheduling) and reuse their working set in the cache memory private to the processing cores (affinity). The method allows threads in a process to be coscheduled, while selecting cores for processes such that the affinity between threads and processing cores is respected in a multiprogrammed environment. The benefits are provided through a middleware on top of the Xeon Phi micro kernel and the Intel runtime. The middleware handles multi-processing on Xeon Phi coprocessor-based servers by automatically avoiding thread and memory oversubscription and load balancing processes across the cores of the Xeon Phi and across several Xeon Phi coprocessors. The system is completely transparent to the users and requires no changes to the underlying software such as the MPSS and the Linux kernel running on the coprocessor. It uses a scheduling technique to schedule processes and Xeon Phi offload regions within processes simultaneously. It also uses algorithms to set thread affinity and load balance processes across coprocessors.

The system achieves faster operation when multiple processes share a many integrated core coprocessor system. Faster operation includes end-to-end turn-around-time per process (latency), as well as the number of processes completed per unit time (throughput). The system protects against thread and memory over-subscription resulting in severe performance loss and crashes. Within a coprocessor, it manages cores such that offloads of different processes run on separate sets of cores, and offloads in the same process use the same cores (thus respecting data affinity). The system load balances multiple processes across multiple Xeon Phi coprocessors. The manager provides a transparent user-level middleware that includes a suite of run-time techniques explicitly designed to enhance performance portability in the presence of multi-processing.

BRIEF DESCRIPTION OF THE DRAWINGS

FIG. 5A shows an exemplary scheduling procedure for the system of FIG. 1.

DESCRIPTION

Figure 1A:
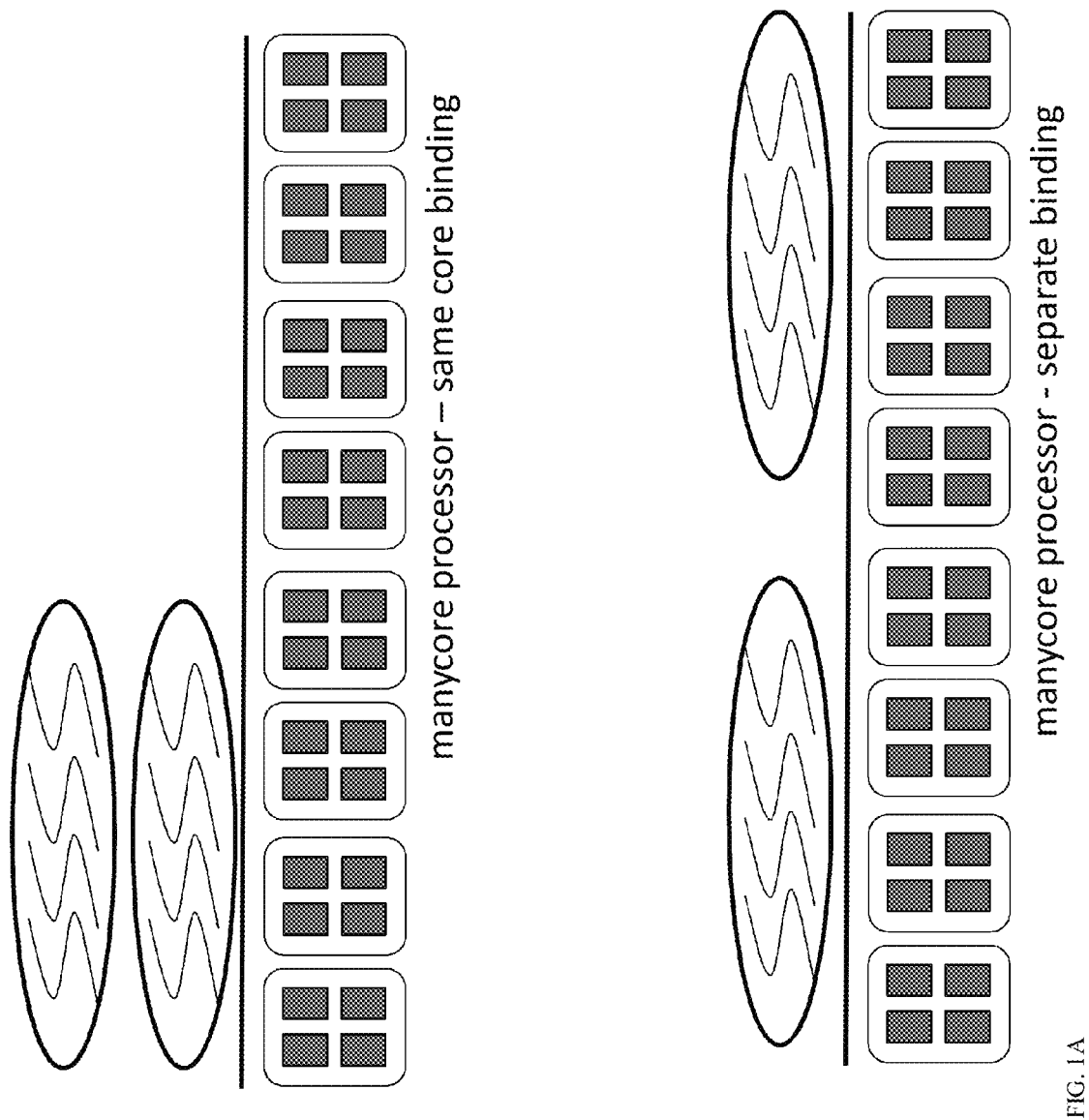
FIG. 1A shows an exemplary thread group with user-specified affinity settings.
Figure 1B:
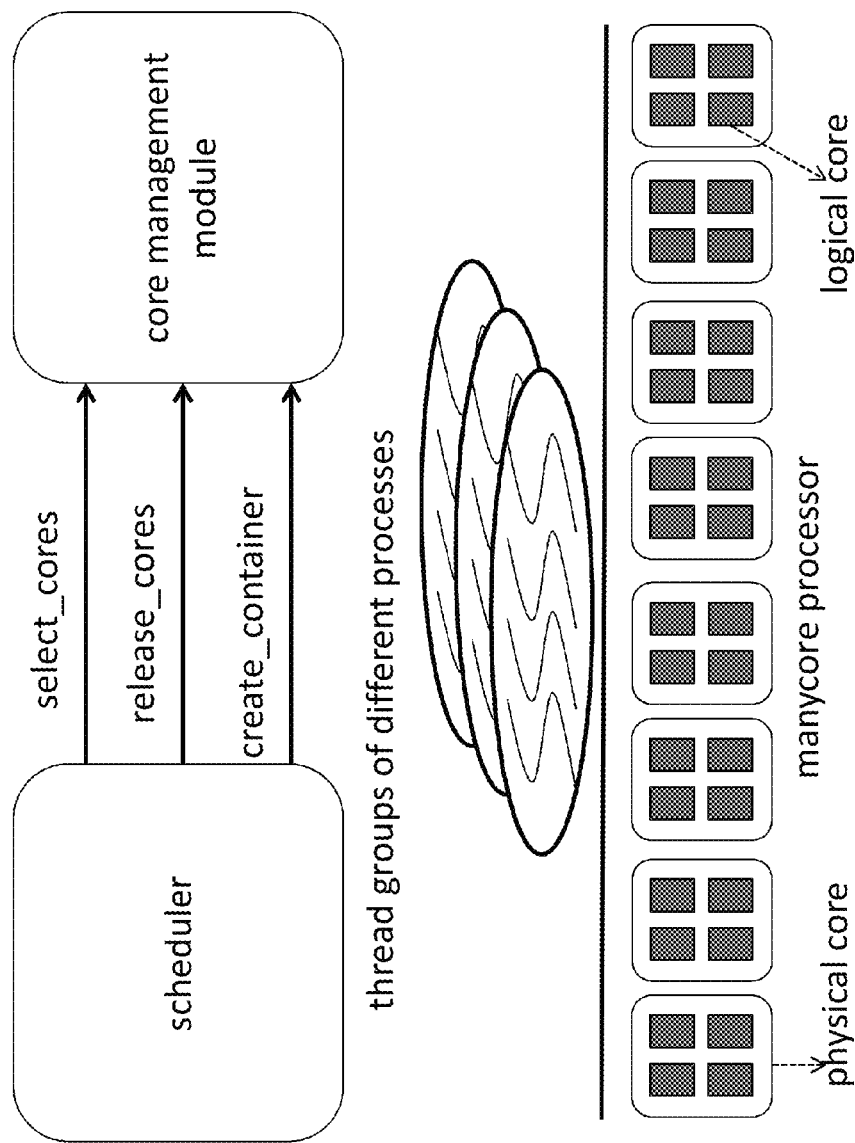
FIG. 1B shows an exemplary interface of a core management module.

FIG. 1A shows exemplary illustration of thread groups with user-specified affinity setting while FIG. 1B shows an exemplary interface of a core management module. On top, two thread groups are bound to the same set of processing cores; while on the bottom the system uses a core container to achieve balanced workload distribution and performance isolation.

Many modern processors support simultaneous multithreading (SMT). In SMT a physically-present core, called physical core, can execute multiple threads simultaneously. If a physical core supports N-way SMT, the physical core has N logical cores. A logical core is idle if there is no active thread that is currently running on the core. A physical core is idle if all of its logical cores are idle. As an example, a physical core in FIG. 1A has four logical cores.

Although using thread affinity can improve the performance of a single application, non-coordinated thread-to-core affinity bindings from different but concurrent applications may lead to unbalanced workload across processing cores. The negative effects of unbalanced workload causes the concurrent runtime to be significantly worse than sequential runtime. This is because the OS cannot evenly distribute the threads across the processing cores due to user-specified thread-to-core affinity bindings.

To run efficiently, a core management method will be discussed that provides performance isolation for concurrent multithreaded processes on manycore processors. The method uses core containers and a core selection process to evenly distribute workload across processors, and tries to preserve the thread-to-core affinity of a thread group. Intuitively, the core management module can schedule concurrent multithreaded processes so that different groups of threads run on disjoint sets of processing cores.

Figure 1C:
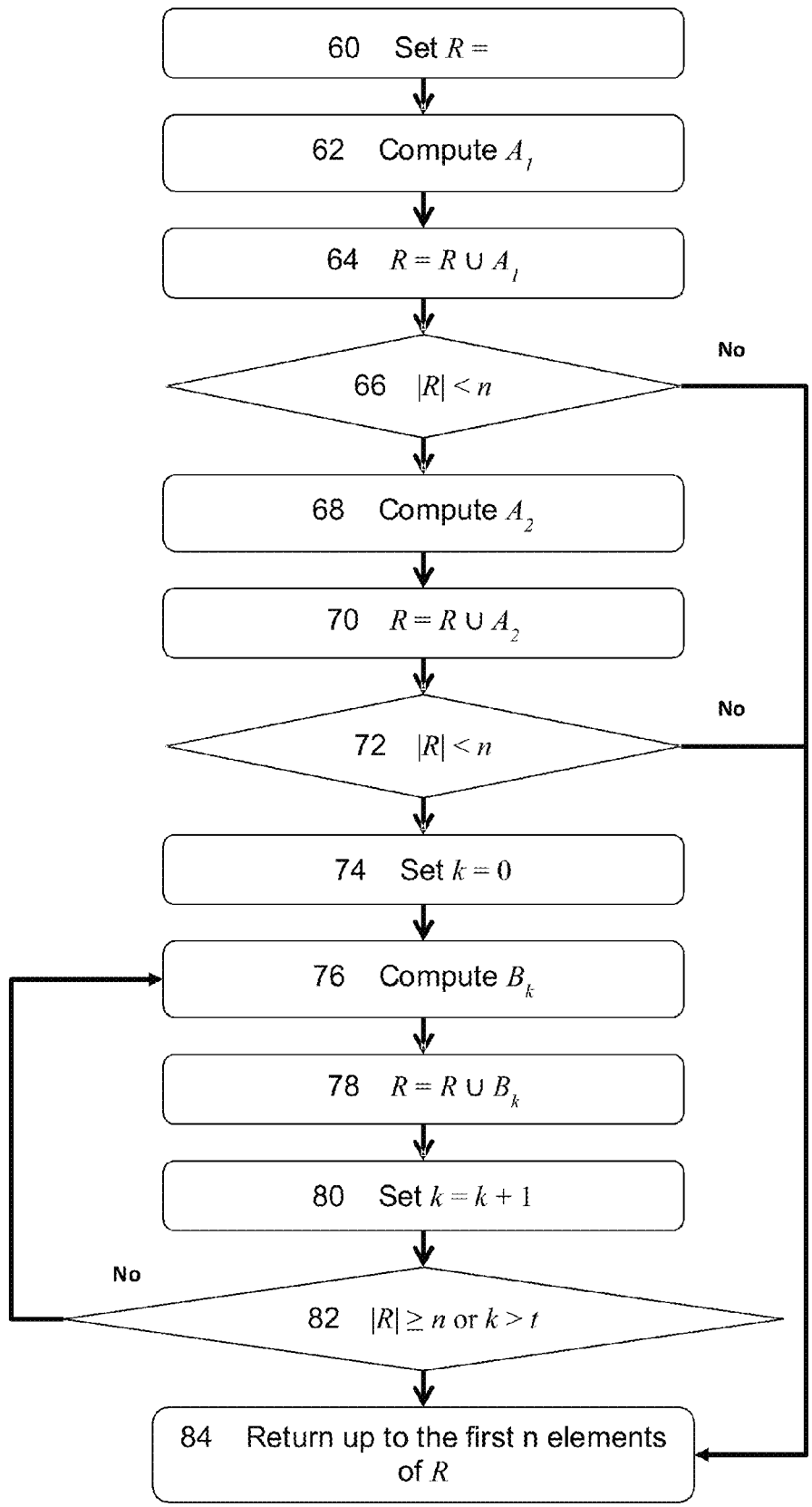
FIG. 1C shows an exemplary process for core management.

FIG. 1C shows an exemplary process for core selection. In 60, the set of processing cores R is initialized as an empty set. The list of logical cores $A_1$ is computed in 62. Next, in 64, the union of R and $A_1$ is done, and the process checks if the number of processing cores in R, |R|, is less than n. If not, the process jumps to 84 where it returns up to the first n elements of R as the solution. Otherwise, the process determines $A_2$ in 68. Next, in 70, the union of R and $A_2$ is done, and the process checks if |R| is less than n. If not, the process jumps to 84 where it returns up to the first n elements of R as the solution. Otherwise, the process sets k to zero in 74 and determines $B_k$ in 76. In 78, R is set to the union of R and $B_k$. Next, in 80, the process increments k and then checks if |R| is greater than or equal n or k is greater than t. If none of these two conditions are satisfied, the process loops back to 76. Otherwise the process returns up to the first n elements of R in 84. The pseudo-code for the core selection process is as follows:

| CORE-SELECTION(n) |
| --- |
| 1  List R = ∅ |
| 2  Compute $A_1$ |
| 3  R = R ∪ $A_1$ |
| 4  if |R| < n |
| 5    Compute $A_2$ |
| 6    R = R ∪ $A_2$ |
| 7    if |R| < n |
| 8      k = 0 |
| 9      repeat |
| 10        Compute $B_k$ |
| 11        R = R ∪ $B_k$ |
| 12        k = k + 1 |
| 13      until |R| ≥ n or k > t |
|       // t is the number of thread groups. |
| 14  if |R| ≥ n |
| 15    Return the first n cores of R |
| 16  else Return R |

The status arrays F, $G_1$, $G_2$, $P_1$, and $P_2$ are updated when there is a scheduling event. After the core selection algorithm returns and the scheduler decides to schedule the thread group, the arrays are updated in the following order:

1. First F[i] is set to 0 if logical core i is assigned to the thread group.
2. If $P_1$[j] is 0 and any of the logical cores of physical core j is assigned to the thread group, we increment $G_1$[j] by 1. In contrast, if $P_1$[j]=1 and none of the logical cores of physical core j is assigned to the thread group, we decrement $G_1$[j] by 1. Similarly if $P_2$[i] is 0 and logical core i is assigned to the thread group, we increment $G_2$[i] by 1. On the other hand, if $P_2$[i] is 1 and logical core i is not assigned to the thread group, we decrement $G_2$[i] by 1.
3. We set $P_1$[j] to 1 if any of the logical cores of physical core j is assigned to the thread group. Otherwise $P_1$[j]=0. Similarly, $P_2$[i] is 1 if logical core i is assigned to the thread group, otherwise $P_2$[i] is 0.

When a thread group is blocked or preempted, F[i] is set to 1 if logical core i is used by the thread group ($P_2$[i]=1). When a thread group terminates, $G_i$[j] is decreased by 1 if any of the logical cores in physical core j was used by the thread group ($P_1$[j]=1). $G_2$[i] is also decreased by 1 if logical cores i was used by the thread group ($P_2$[i]=1).

Next the binding of the threads to the cores is detailed. Once a set of cores is selected for a thread group, the threads in the thread group are bound to the selected cores. The binding depends on the user-specified thread affinity and the thread-to-core bindings in the previous active phase of the same thread group (if any).

The first step of our thread binding algorithm assigns threads in a thread group that has been activated earlier to cores. The process tries to bind the threads to the exactly same cores that were used in the last activation of the thread group. It is possible that only a subset of the threads can be bound this way, since some of the cores used in the previous active phase of the thread group may not be selected for the current activation.

The second step binds the threads not yet bound in the first step to the remaining cores. First, among the selected logical cores we remove the ones that were also used in the last active phase of the thread group from consideration. This is because these cores have been assigned threads in the first step. Unlike the first step, the thread-to-core binding depends on user-specified affinity setting. Suppose there are threads to be assigned to logical cores, each thread is labeled from 0 to (N−1) and each core from 0 to (M−1). The bindings of the three affinity settings are described below:

Compact: Thread i is bound to logical core (i mod M).

Scatter: Assume each physical core consists of L logical cores. There are P=M/L physical cores. We assign thread i to a logical core whose index is:

$$(i \bmod P) \times L + (i/P) \bmod L$$

None: The "none" setting does not bind a thread to any particular logical core. Instead, very thread is bound to all of the selected logical cores. So the OS scheduler has the freedom to dynamically decide which core a thread will run on.

Figure 1D:
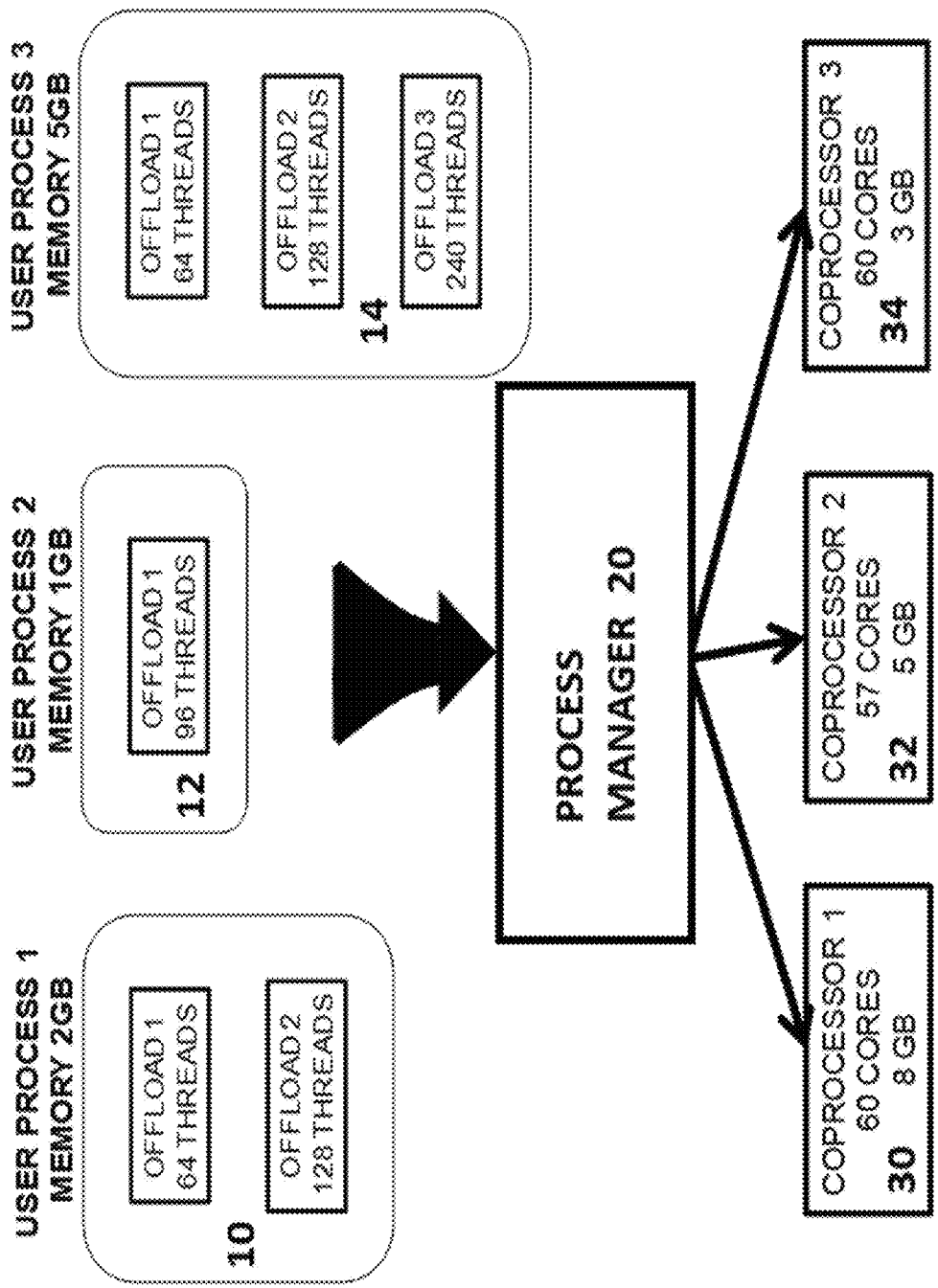
FIG. 1D shows an exemplary process manager for a multiprocessor system.

FIG. 1D shows a high-level view of a process manager 20 called the COSMIC system. In a server with multiple Xeon Phi coprocessors 30, 32 and 34, each with different amounts of memory and cores, COSMIC manages offloads from several user processes 10, 12 and 14. Each user process contains several offload blocks that are executed sequentially. The process has a single memory requirement for all its offloads, while the offloads themselves have their own thread requirements. Thus, before execution, every process requests the process manager 20 for memory, and every offload requests the process manager 20 for threads. COSMIC arbitrates the requests by taking into consideration the different available coprocessors, the available cores within each device and the available memory. It then schedules and allocates resources for the offloads in such a way that thread and memory oversubscription are avoided, and the devices as well as the cores within them are load balanced. COSMIC manages processes and coprocessor resources to achieve the following:

Avoid over-subscribing coprocessor hardware threads.
Avoid over-subscribing and carefully manage the limited coprocessor main memory.
Map threads to cores, ensuring minimal thread migration, while respecting data affinity and persistence across offload regions.
Load balance applications across multiple coprocessors while ensuring locality of data.

Given a server populated with multiple accelerators such as the Xeon Phi coprocessors, with several users and processes competing for coprocessor resources, the goals of the process manager 20 are to manage processes and coprocessor resources and:

Avoid over-subscribing coprocessor hardware threads.
Avoid over-subscribing and carefully manage the limited coprocessor main memory.
Map threads to cores, ensuring minimal thread migration, while respecting data affinity and persistence across offload regions.
Load balance applications across multiple coprocessors while ensuring locality of data.

To simplify memory management, one implementation requests that the programmer specify the maximum memory required on the Xeon Phi for each process. This is similar to job submission requirements in cluster schedulers. In typical cases, different offloads of the same process often share data in order to reduce data movement between the host and Xeon Phi. Thus, as long as the process exists, it will use the device memory of the coprocessor. However, unlike cluster schedulers, this embodiment does not require the process specify core, devices or other resources, but infers it automatically from the number of threads requested by the offload. Unlike memory that is reserved for the life of a process, threads (and cores) are given to an offload when it starts executing and released when the offload completes for use by other offloads.

COSMIC has several parameters that may be set by the server administrator or user that can affect its policies and behavior. An administrator can configure the following parameters of COSMIC to affect its scheduling decisions:

Aging threshold: how many times the scheduler attempts to schedule a process or an offload before the scheduler blocks all other pending processes or offloads from being scheduled.
Thread factor $T_o$ (1 or larger): the offload "fit" function considers $T_o$*hardware threads as the total number of threads in a coprocessor. If $T_o$ is greater than 1, the number of threads is oversubscribed in a measured way to leverage the fact that slight oversubscriptions may actually be beneficial since otherwise offloads may have to wait longer.
Memory factor $M_o$ (1 or larger): the process "fit" function considers $M_o$*physical memory as the total physical memory of the coprocessor. If $M_o$ is greater than 1, the memory is oversubscribed in a measured way to leverage the fact that not all processes will require their maximum requested memory at the same time.

COSMIC also expects from the owner of each process the following directives:

Memory limit: the peak memory the process will use over its lifetime. COSMIC kills any process that exceeds its memory usage as described later in this section.
Preferred thread affinity: In order to allocate Xeon Phi cores for an offload, COSMIC needs to know how user threads must be mapped to cores. COSMIC provides three affinity settings for an user to select: scatter, compact, and none. These affinity settings will be explained in detail shortly.

Figure 3:
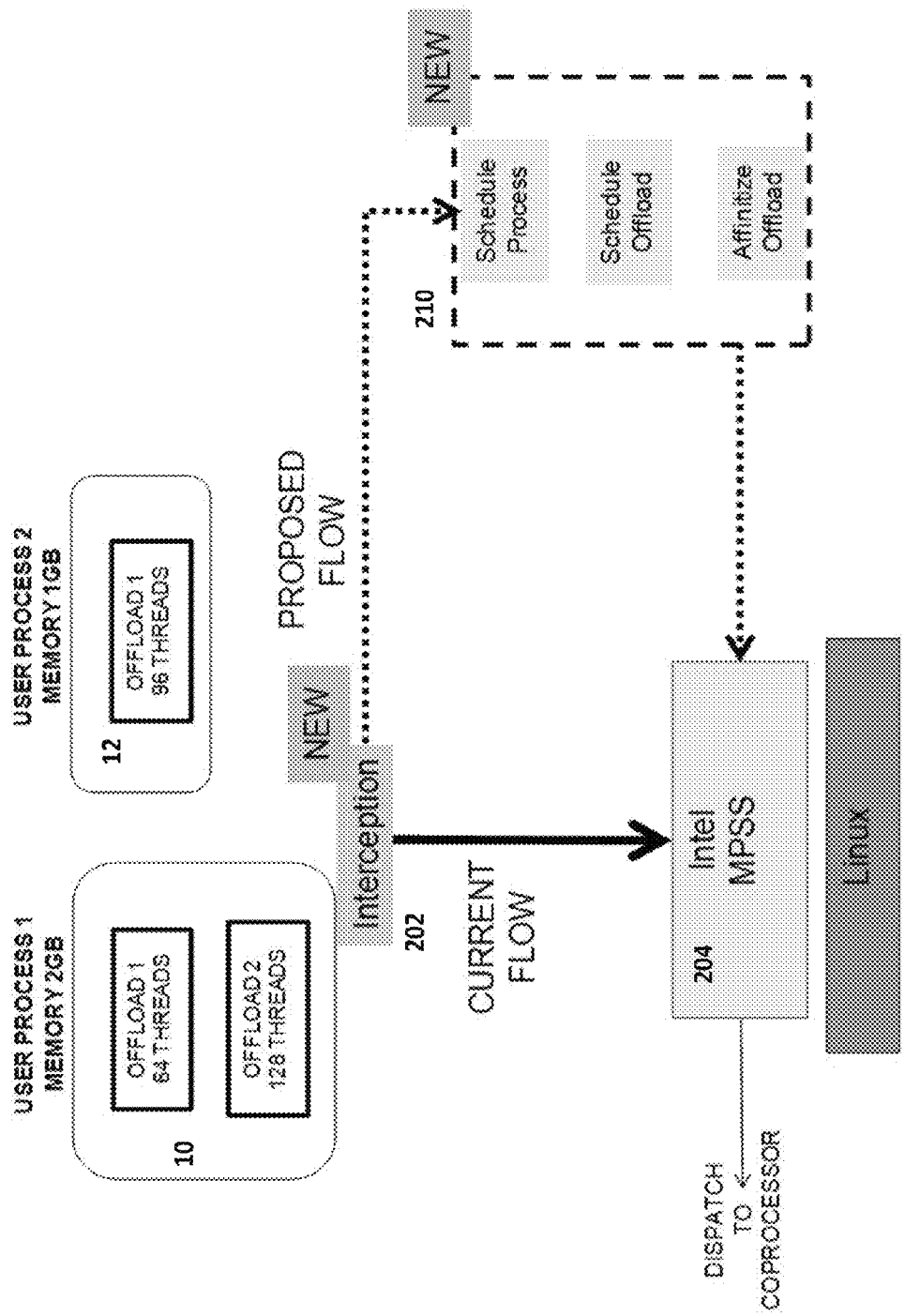
FIG. 3 shows an exemplary flow of the process manager of FIG. 1.

In one embodiment, a core management module provides a simple interface that can be used by a scheduler and will be explained next. The interface of the core management module provides three functions to be used by a scheduler. The first function, select_cores, selects a specified number of logical cores and return a list of selected logical cores. The second function, release_cores, accepts a list of logical cores and marks them as available. The third function, create_container, creates a container consisting of a list of logical cores to be exclusively used by a group of threads. It may also exercise a specified thread-to-core affinity setting so each thread in the thread group is bound to a particular logical core in the container. FIG. 3 describes the high-level interactions between the scheduler and the proposed core management module.

A scheduler calls the functions exposed by the core management module to select logical cores and set up core containers for thread groups. The scheduler first calls select_cores of the core management module to select logical cores for the thread group. Based on the number of the cores returned by select_cores and the scheduler's own policy, the scheduler will decide whether the thread group can be scheduled. If the scheduler schedules the thread group to run, it can call create_container to ask the core management module to configure a CPU container consisting of the selected logical cores to execute the threads of the thread group. If the thread group specifies certain thread-to-core affinity bindings, the core management module will also exercise these bindings automatically within the container. Once a thread group becomes inactive, the scheduler will call release_cores to inform the core management module to release the cores assigned to the thread group.

The select_cores function of the core management module accepts several inputs reflecting the resource requirements of a thread group. The first input is the number of the threads in the thread group. The rest of the inputs are optional and will be explained in detail shortly: the preferred thread-to-core affinity setting, the number of threads to be assigned to a physical core (called thread-to-core ratio), and if the thread group is willing to share the physical cores with other thread groups.

The select_cores function returns a list of selected logical cores to be used by a thread group. It ensures that each logical core will only be used by at most one thread group at any time. To ensure this exclusive usage, select_cores only selects idle logical cores. Notice that there may not be enough idle logical cores left for the thread group. In such a case the core management module returns as many idle logical cores as it can find, and lets the scheduler decide whether the thread group can proceed.

While select_cores restricts a logical core to be used by at most one thread group, it does allow a thread group to opt for sharing physical cores with other thread groups. By default a physical core is not shared between different thread groups, so better performance isolation can be achieved. On the other hand, by allowing a physical core to be shared between multiple thread groups belonging to different user processes, more thread groups can execute simultaneously. The increased concurrency may potentially lead to higher system throughput. In case there are multiple thread groups that are willing to share physical cores, a physical core may execute multiple threads simultaneously from different thread groups. If no thread group allows physical core sharing, every physical core will only execute threads from the same thread group at any moment of time (but a physical core may execute threads from different thread groups in a time-multiplexed fashion).

To avoid oversubscription of the logical core resources a thread group can also specify the maximum number of threads that can be assigned to a physical core to the core management module. This number is called thread-to-core ratio. The ratio is usually between 1 and the number of logical cores in a physical core, which is also the default value in case no value is specified. For example, the default value of the thread-to-core ratio for Xeon Phi is 4. However, a ratio higher than the number of logical cores per physical core can also be used by a thread group.

Similar to Intel's OpenMP library the core selection module allows a thread group to choose one of the three different thread-to-core affinity settings: compact, scatter, and none. Below we give overall descriptions of these three affinity settings. For "compact" affinity setting, as few physical cores as necessary are used to host all threads without violating the specified thread-to-core ratio. For "scatter" affinity, we use as many physical cores as possible so that each physical core has at least 1 thread, also without violating the specified thread-to-core ratio. In all of the three affinity settings described above, each thread will be bound to a logical core using the thread-binding function provided by the threading library. In contrast, the "none" affinity setting uses as few physical cores as necessary to host all threads without violating the thread-to-core ratio, but the threads are not bound to any specific logical core selected by select_cores.

The core selection process that is implemented in the function select_cores of the core management module is described next. The number of logical cores to be assigned to a thread group is automatically derived based on the number of the threads in a thread group, whether the thread group can share physical cores, and the thread-to-core affinity and its thread-to-core ratio. If a thread group does not share physical cores with other thread groups, the process first calculates the number of physical cores required by the thread group based on the affinity setting of the thread group. The number of the required logical cores is the number of logical cores contained in these many physical cores. On the other hand, if a thread group is willing to share physical cores, the number of logical cores required by the thread group is the same as the number of threads in the thread group.

To select logical cores our core selection algorithm goes through multiple lists of logical cores in sequence. The algorithm first chooses logical cores that were assigned to earlier active phases of the same thread group but are not being assigned to any other thread groups. If more logical cores are needed, then our method picks cores that are both idle and not currently assigned to any thread group. If still more cores are needed, then logical cores that are idle but have already been assigned to other thread groups, are chosen.

In order to construct the lists of logical cores, one embodiment of the disclosed method uses several arrays to keep track of the status of both of the physical and the logical cores. For each manycore processor, the following arrays are maintained:

F: Idle core array, $F[i]=1$ if logical core i is idle. Otherwise $F[i]=0$.

$G_1$: $G_1[i]$ records the number of thread groups that have been allocated to physical core i.

$G_2$: $G_2[i]$ records the number of thread groups that have been allocated to logical core i.

And two arrays are maintained for each thread group:

$P_1$: $P_1[i]=1$ if physical core i was assigned to the thread group during the thread group's latest active phase. Otherwise $P_1[i]=0$.

$P_2$: $P_2[i]=1$ if logical core i is assigned to the thread group during the thread group's latest active phase. Otherwise $P_2[i]=0$.

Using these arrays the following lists of cores can be easily computed:

$A_1$: If the thread group can share physical cores, logical core i is in $A_1$ if and only if i is idle ($F[i]=1$).

If a thread group does not share physical cores, logical core i is in $A_1$ if and only if i is idle ($F[i]=1$) and all of the logical cores that are in the same physical core as i are also idle. Cores in $A_1$ are called eligible cores.

$A_2$: A logical core i is in list $A_2$ if and only if core i is eligible ($E[i]=1$), i was assigned to the previous active phase of the thread group ($P_2[i]=1$), and i has only been used by the same thread group ($P_2[i]=G_2[i]=1$).

$B_k$: For lists $B_0, B_1, \ldots, B_t$, where t is the number of thread groups, a logical core i is in list $B_k$ if and only if i is eligible ($E[i]=1$), and the physical core containing i is being used by k thread groups ($G_1[i]=k$).

Figure 2:
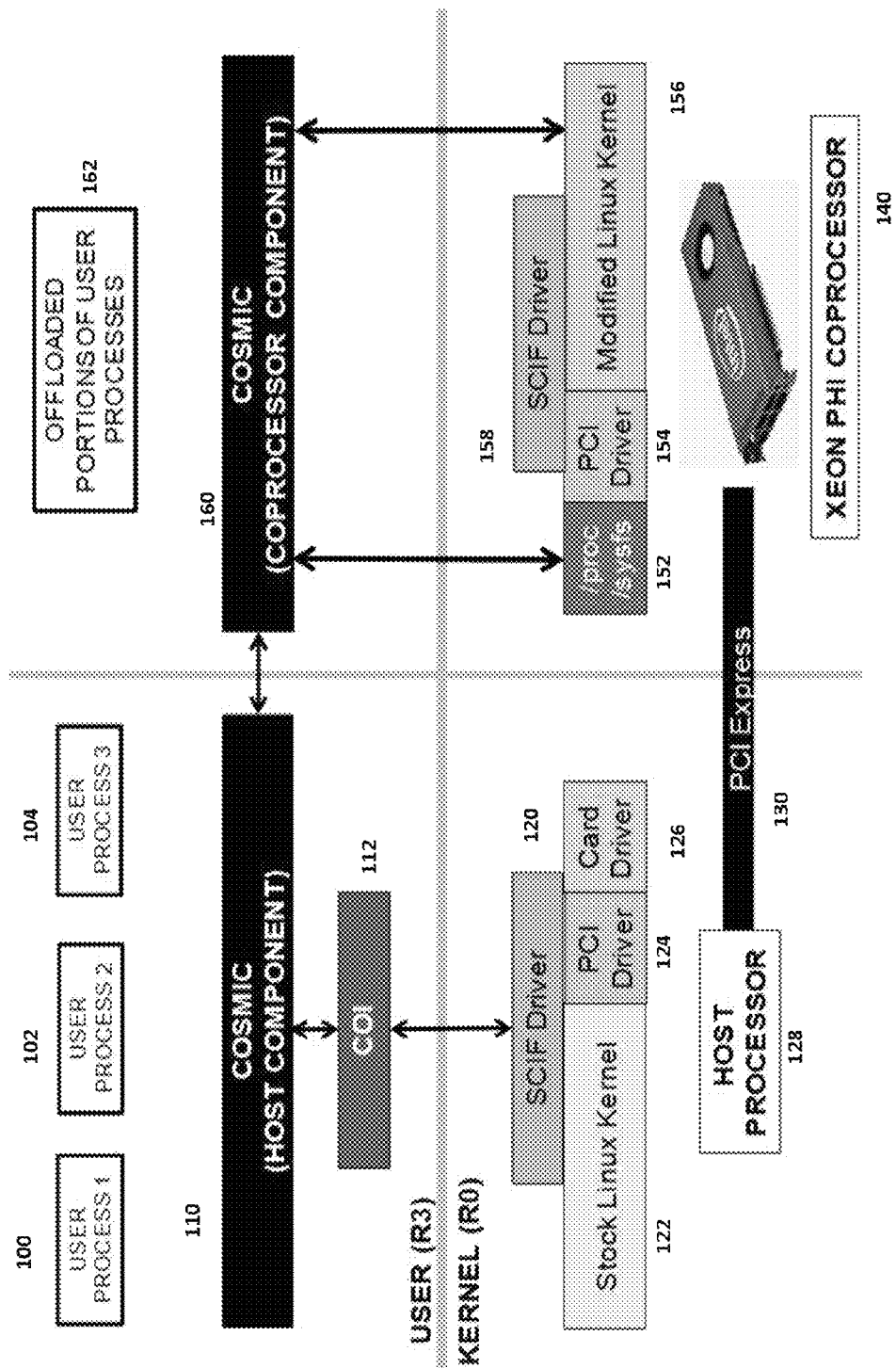
FIG. 2 shows an exemplary software stack with host and co-processor components of the multi-processor software stack.

FIG. 2 shows a block diagram of the Xeon Phi software stack, and where COSMIC fits in. The left half of the figure shows the stack on the host processor, while the right half shows the stack running on the coprocessor. The top half represents user space, and the bottom half represents kernel space. The host processor runs a Linux kernel 122 with a PCI and card driver 124-126 to communicate with the card. Along with the operating system, a Symmetric Communication Interface (SCIF) driver 120 is provided for inter-node communications. A node can be a Xeon Phi device or the host processor. SCIF 120 provides a set of APIs for communication and abstracts the details of communicating over the PCIe bus. On top of SCIF 120, the Coprocessor Offload Infrastructure (COI) 112 is a higher-level framework providing a set of APIs to simplify development of applications using the offload model. COI provides APIs for loading and launching device code, asynchronous execution and data transfer between the host and Xeon Phi. The coprocessor portion of the software stack consists of a modified Linux kernel 156, the PCI driver 154 and the standard Linux proc file system 152 that can be used to query device state (for example, the load average). The coprocessor portion also has a SCIF driver 158 for communicating over the PCI bus with the host and other nodes. The COI 112 communicates with a COSMIC host component 110 that communicates with user processes 100-104. The host component 110 interacts with a COSMIC coprocessor component 160 that handles offloaded portions of user processes 162.

The COSMIC host middleware component has a global view of all processes and offloads emanating from the host, and knowledge of the states of all coprocessor devices. COSMIC is architected to be lightweight and completely transparent to users of the Xeon Phi system. As shown in FIG. 2, COSMIC exists in the user space, but interacts with both user processes and other kernel-level components. It controls offload scheduling and dispatch by intercepting COI API calls that are used to communicate with the device. This is a key mechanism of COSMIC that enables it to transparently gain control of how offloads are managed. We first briefly describe by way of example how offload blocks are expressed using the COI API. The Xeon Phi compiler converts all offload blocks that are marked by pragmas into COI calls. The user's program with offload pragmas is compiled using Intel's icc or a gcc cross-compiler for the Xeon Phi. The compiler produces a host binary, and Xeon Phi binaries for all the offload portions. The offload portions are first translated into a series of COI API calls. The figure shows the important calls for a simple example: first COIEngineGetCount and COIEngineGetHandle get a handle to the coprocessor specified in the pragma. Then COIProcessCreateFromFile creates a process from the binary corresponding to the offload portions. Each offload block is represented as a function, and COIProcessGetFunctionHandles acquires the handles to these functions. COIPipelineCreate creates a "COI pipeline" which consists of 3 stages: one to send data to the coprocessor, one to perform the computation and one to get data back from the coprocessor. Then COIBufferCreate creates buffers necessary for inputs and outputs to the offload. In this example, three COI buffers corresponding to the arrays a, b and c are created. COIBufferCopy transfers data to the coprocessor, and COIPipelineRunFunction executes the function corresponding to the offload block. Finally, another COIBufferCopy gets results (i.e., array c) back from the Xeon Phi. Since every offload is converted into a series of COI calls (which has a standard API), COSMIC can transparently control offload scheduling and dispatch.

COSMIC is architected as three components implemented as separate processes: the front-end, the scheduler and the monitor, the latter comprising a host portion and a card-side portion, as depicted in FIG. 2. Inter-process interfaces are clearly defined: each process communicates with the other two using explicit messages.

The COSMIC front-end is responsible for intercepting COI calls and communicating with the COSMIC scheduler to request access to a coprocessor. It accomplishes this using library interposition. Every user process links with the Intel COI shared library that contains definitions for all API function modules. COSMIC intercepts and redefines every COI API function: the redefined COI functions perform COSMIC-specific tasks such as communicating with the COSMIC scheduler, and then finally calls the actual COI function. With the redefined functions, COSMIC creates its own shared library that is pre-loaded to the application (using either LD_PRELOAD or redefining LD_LIBRARY_PATH). The pre-loading ensures that COSMIC's library is first used to resolve any COI API function.

```
#pragma offload target (mic:1)      \
    in (a: length (SIZE) )          \
    in (b: length (SIZE) )          \
    inout (c: length (SIZE) )
    for (int i = 0 ; i < SIZE ; i++)
        c [i] = a [i] + b [i] ;
                    ↓   ICC
                        or
                        GCC cross compiler
```

```
/* get handle to coprocessor */
COIEngineGetCount (...) ;
COIEngineGetHandle (...) ;
/* create a process from the binary representing
   the offload block */
COIProcessCreateFromFile (...) ;
COIProcessGetFunctionHandles (...) ;
/* create a COI pipeline */
COIPipelineCreate (...) ;
/* create input buffers: a, b and c */
COIBufferCreate (...) ;
/* copy the buffers to the coprocessor */
COIBufferCopy (...) ;
/* run the function representing the offload region */
COIPipelineRunFunction (...) ;
/* copy results back */
COIBufferCopy (...) ;
/* clean up */
COIBufferDestroy (...) ;
COIProcessDestroy (...) ;
```

Based on the type of COI API intercepted, the front-end sends the following different messages to the scheduler:

NewProcess: When an offload is first encountered for a a process, the front-end sends a NewProcess message to the scheduler indicating that the scheduler should account for a new process in its book-keeping. Every new process is annotated with its memory requirement provided by the user.

NewOffload: For every offload, the front-end sends a NewOffload message to the scheduler indicating the process to which the offload belongs and the number of threads it is requesting. It also indicates the size of the buffers that need to be transferred to the coprocessor for this offload.

OffloadComplete: When an offload completes, the front-end sends an OffloadComplete message to the scheduler so that it can account for the newly freed resources such as coprocessor cores and threads.

ProcessComplete: When a process completes, the front-end sends a ProcessComplete message to the scheduler to account for the freed memory used by the process.

The COSMIC scheduler is the key actor in the COSMIC system and manages multiple user processes with offloads and several coprocessor devices by arbitrating access to coprocessor resources. It runs completely on the host and has global visibility into every coprocessor in the system. In scheduling offloads and allocating resources, it ensures no thread and memory oversubscription and load balances coprocessor cores and devices to most efficiently use them.

A key distinction between the COSMIC scheduler and traditional operating system schedulers is that COSMIC concurrently schedules processes and offloads within the processes. Each process has a memory requirement, while each offload has a thread requirement. Various coprocessors in the system may have different memory and thread availabilities. Under these constraints, the goal of the scheduler is to schedule processes and offloads by mapping processes to Xeon Phi coprocessors and offloads to specific cores on the coprocessors. The scheduler also ensures fairness, i.e., makes sure all processes and offloads eventually get access to coprocessor resources.

The scheduler is event-based, i.e., a scheduling cycle is triggered by a new event. A new event can be the arrival of a new process, the arrival of a new offload in an existing process, the dispatching of an offload to a Xeon Phi device, the completion of an offload or the completion of a process. A queue of pending processes is maintained: each arriving new process is added to the tail of the pending process queue. A process is eventually scheduled to one Xeon Phi coprocessor. The scheduler also maintains a queue of pending offloads for each Xeon Phi coprocessor in the system. Each new offload is added to the tail of the offload queue belonging to the Xeon Phi coprocessor on which its process has been scheduled.

FIG. 3 shows workflow through the Xeon Phi software stack when multiple processes are issued. They are all fed to the Xeon Phi MPSS runtime, which often serializes them in order to avoid crashing the coprocessor. The manager 20 avoids this by intercepting COI calls at 202, and the manager 20 takes control of the processes and offloads. Specifically, in 210 the manager 20 performs process scheduling, offloads scheduling and affinitizes offloads to specific cores on the co-processor. Once this is done, it issues the processes and offloads to the MPSS at 204 and continues with the Linux operating system 206.

Figure 4:
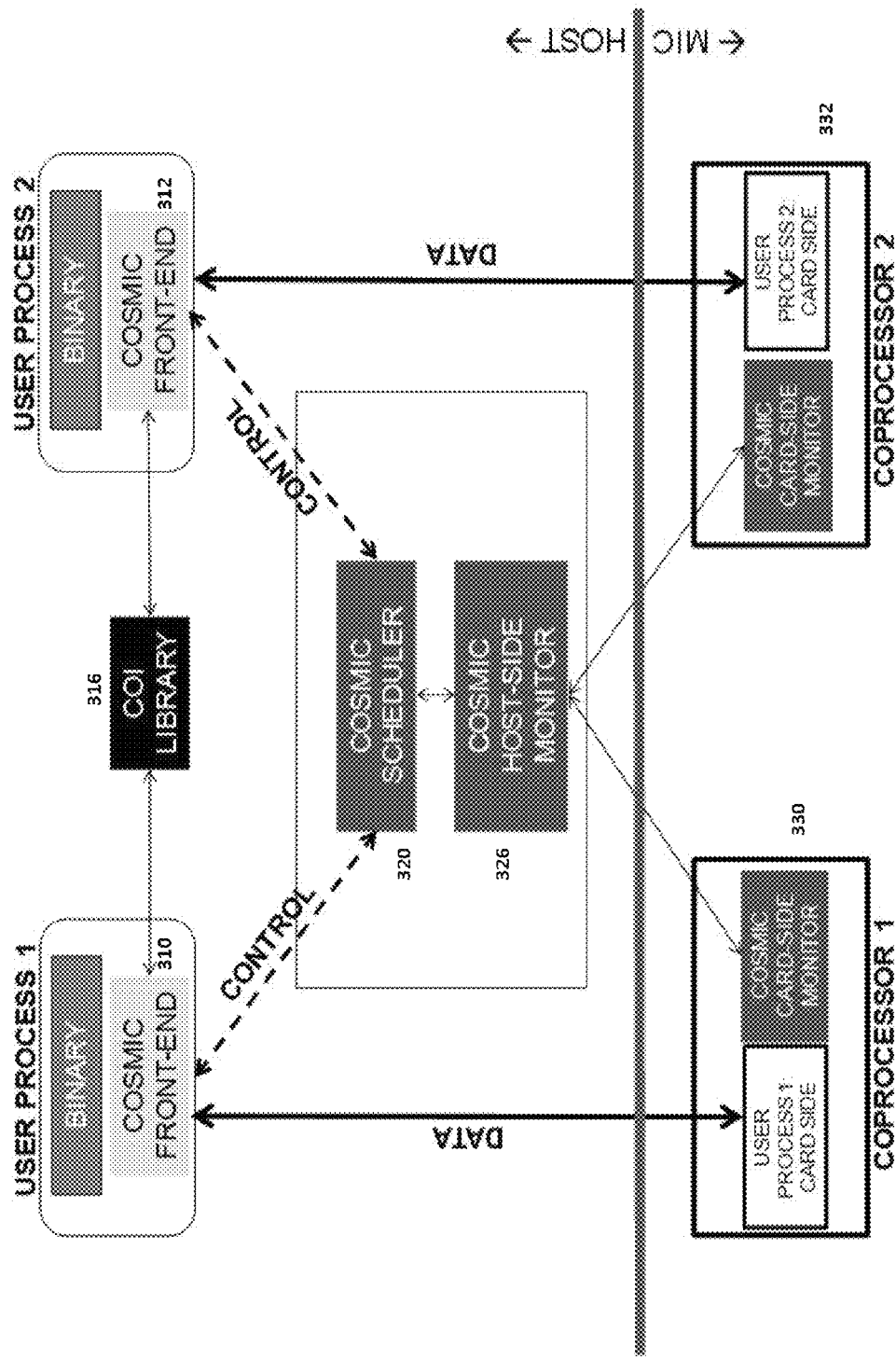
FIG. 4 shows an exemplary architecture of the process manager of FIG. 1.

FIG. 4 shows an exemplary architecture of the process manager of FIG. 1. COSMIC is architected as three components implemented as separate processes: front-ends 310-312 that communicate with a library 316, scheduler 320 and monitor 326, the latter comprising a host portion and a card-side portion. Inter-process interfaces are clearly defined: each process communicates with the other two using explicit messages.

FIG. 5A shows an exemplary scheduling procedure. When a new event occurs, a pending process is selected and scheduled to a coprocessor that has enough free memory. Then offload queues corresponding to each Xeon Phi are examined, and the scheduler dispatches an offload to each coprocessor if it has enough free threads. Both processes and offloads are selected based on an aging-based first-fit heuristic. FIG. 5A shows the scheduling procedure. When a new event occurs, a pending process is selected and scheduled to a coprocessor that has enough free memory. Then offload queues corresponding to each Xeon Phi are examined, and the scheduler dispatches an offload to each coprocessor if it has enough free threads. Both processes and offloads are selected based on an aging-based first-fit heuristic.

Figure 5B:
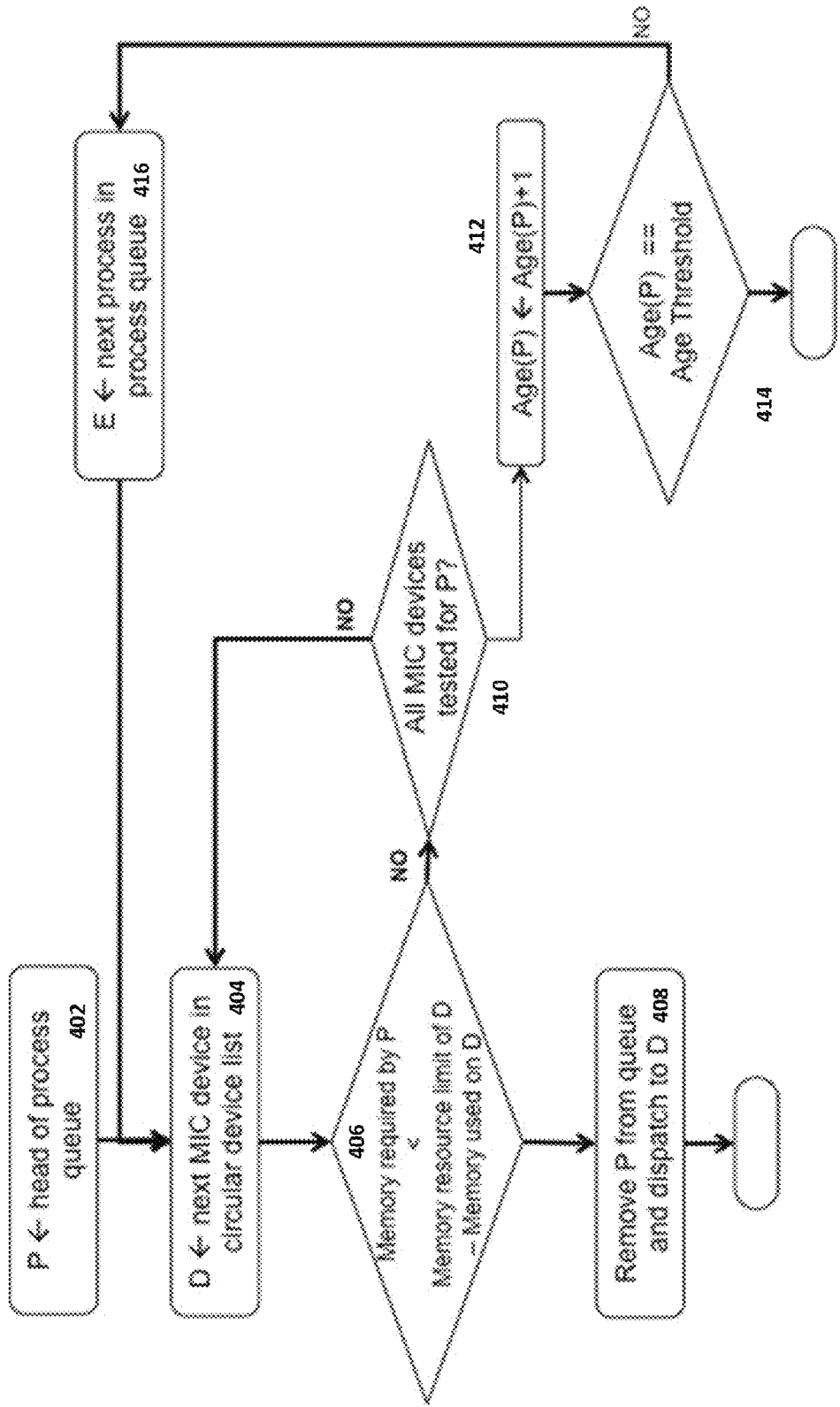
FIG. 5B shows an exemplary method for aging-based first-fit procedure for process selection.

The aging-based first-fit procedure for process selection is shown in FIG. 5B. At the start of a scheduling cycle, let P be the process at the head of the pending process queue (402). The scheduler maintains a circular list of the Xeon Phi coprocessors in the system. Let D be the next coprocessor in the list (404). The scheduler checks to see if the memory required by P fits in the available memory of D (406). If it does, P is removed from the queue and dispatched to D (408). If not, the next coprocessor in the circular list is examined (410). If P does not fit in any coprocessor, its age is incremented, and the next pending process is examined (412). When a process' age reaches a threshold, all scheduling is blocked until that process is scheduled (414). This ensures fairness since all processes will get a chance at being scheduled.

Scheduling an offload is similar to scheduling a process, with one difference. Instead of memory, an offload has a thread requirement; COSMIC checks if the threads requested by an offload are available on the coprocessor on which the offload's owner process has been scheduled. If so, the offload is dispatched. If not, it increments the offload's age, and examines the next offload in the queue.

An administrator can specific the following parameters to tailor the scheduler's behavior: (i) aging threshold, (ii) thread over-scheduling factor and (iii) memory over-scheduling factor. The latter two indicate to what extent threads and memory may be oversubscribed.

Next, the affinity setting is discussed. COSMIC selects the cores that are used by an offload, and affinitizes threads to these cores using programmer directives. The core selection procedure for an offload is discussed next. COSMIC's core selection algorithm scans one or more lists of free physical cores to select cores until it finds enough cores for a given offload region. The number of cores assigned to an offload region is the number of threads used by the offload region divided by the thread-to-core ratio N. The order of the core lists from which COSMIC selects cores reflects the preference of COSMIC's core selection strategy. The first list of physical cores for a new offload region consists of cores that are both free and only used by the earlier offloads coming from the same offload process. If more physical cores are needed, COSMIC picks from a second list of physical cores, which are both free and not currently assigned to other offload processes. If still more cores are needed, COSMIC forms a third list of physical cores, which are the remaining free cores not yet selected.

The COSMIC monitor collects data pertaining to the state of the coprocessors. It has a host-side component, and a component that is resident on each of the coprocessors. The host-side component is primarily responsible for communicating with the scheduler and all the coprocessor-side components. The coprocessor-side components monitor the load on the device, the number of threads requested by each offload and the health of each offload process. If a process dies for any reason, it catches it and reports the reason to the COSMIC scheduler.

To ensure efficient execution of offloads COSMIC adopts several policies to make sure the hardware resources of a Xeon Phi processor are well utilized but not oversubscribed. These policies and their implementations are discussed below. COSMIC limits the total number of actively running software threads on a Xeon Phi device to ensure that the device's physical cores are not oversubscribed. When an offload region is running, all of the threads spawned by the offload process are considered active. Otherwise the threads are considered dormant. COSMIC keeps track of the number of active and inactive software threads spawned by offload processes on a Xeon Phi device. It maintains the ratio between the total number of active software threads spawned by all offload processes and the physical cores to be no more than an integer N, which is configured as 4 in our current implementation of COSMIC. Therefore COSMIC only schedules an offload region to run if the thread-to-core ratio will not exceed N after the offload region starts.

COSMIC uses several mechanisms to detect the number of software threads created by an offload process on a Xeon Phi device. First COSMIC inspects the environment variable MIC_OMP_NUM_THREADS of a submitted job. COSMIC also intercepts omp_set_numthreads_target( ) function calls on the host. Finally on a Xeon Phi device an offload process's call to omp_set_num_threads( ) is also intercepted and the number of threads is reported back the host COSMIC process.

COSMIC relies on the OMP library to get the number of physical cores on a Xeon Phi device. During COSMIC's initialization, the monitor (running on each Xeon Phi device) queries the maximum number of threads by calling omp_get_max_threads( ) and communicates the returned value to COMSIC's host process. COSMIC then divides this number by 4 to obtain the number of the processing cores on a Xeon Phi device. Notice that the number of physical cores derived in this approach is generally one less than the real number of the physical cores. We believe this is because one core is reserved for the OS, and thus we do not adjust the derived number.

To avoid memory oversubscription COSMIC keeps track of the amount of available physical memory for each Xeon Phi device. When COSMIC starts running, it queries each MIC device the amount of free physical memory using a COI function (COIEngineGetInfo). When a user submits a job to COSMIC, the user needs to inform COSMIC the total amount of memory the process needs on a Xeon Phi device through an environment variable COSMIC_MEMORY. COSMIC only launches a submitted job if there is one Xeon Phi device with enough free memory to meet the memory requirement of the job.

COSMIC can be optionally configured to terminate any running process that uses more Xeon Phi memory than the amount specified by the user. COSMIC relies on Linux's memory resource controller to set up a memory container for each offload process on a Xeon Phi device. Each container limits the real committed memory usage of the offload process to the user-specified maximum value. If a process's memory footprint goes over the limit, the memory resource controller invokes Linux's out-of-memory killer (oom-killer) to terminate the offending process.

Enforcing this maximum memory usage rule requires an extra installation procedure and incurs minor runtime performance overhead. The memory resource controller is not enabled in the default Xeon Phi OS kernel. To install a new kernel with the memory resource controller requires adding one line to the kernel configuration file, recompiling the kernel, and rebooting Xeon Phi cards with the new kernel image. The runtime performance overhead due to using the Linux memory controller ranges from negligible to about 5% in real applications.

An exemplary many integrated cores (MIC) co-processor is discussed next. The cores, PCIe Interface logic, and GDDR5 memory controllers are connected via an Interprocessor Network (IPN) ring, which can be thought of as independent bidirectional ring. The L2 caches are shown as slices per core, but can also be thought of as a fully coherent cache, with a total size equal to the sum of the slices. Information can be copied to each core that uses it to provide the fastest possible local access, or a single copy can be present for all cores to provide maximum cache capacity. In one embodiment, the co-processor is the Intel® Xeon Phi™ coprocessor that can support up to 61 cores (making a 31 MB L2) cache) and 8 memory controllers with 2 GDDR5 channels each. Communication around the ring follows a Shortest Distance Algorithm (SDA). Co-resident with each core structure is a portion of a distributed tag directory. These tags are hashed to distribute workloads across the enabled cores. Physical addresses are also hashed to distribute memory accesses across the memory controllers. Each Xeon Phi core is dual-issue in-order, and includes 16 32-bit vector lanes. The performance of each core on sequential code is considerably slower than its multi-core counterpart. However, each core supports 4 hardware threads, resulting in good aggregate performance for highly parallelized and vectorized kernels. This makes the offload model, where sequential code runs on the host processor and parallelizable kernels are offloaded to the Xeon Phi, a suitable programming model. The Xeon Phi software stack consists of a host portion and coprocessor portion. The host portion asynchronous execution and data transfer between the host and Xeon Phi. The coprocessor portion of the software stack consists of a modified Linux kernel, drivers and the standard Linux proc file system that can be used to query device state (for example, the load average). The coprocessor portion also has a SCIF driver to communicate over the PCI bus with the host and other nodes. Together the current Xeon Phi software stack is referred to as the Many Integrated Core (MIC) Platform Software Stack or MPSS for short.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to manage a multi-processor system with one or more multiple-core coprocessors, comprising:
   intercepting coprocessor offload infrastructure application program interface (API) calls;
   scheduling user processes to run on one of the coprocessors;
   selecting cores for the group of threads such that the number of selected cores previously used by the thread group is maximized by:
   selecting allocated cores assigned to at least one earlier active phase of the thread group but not assigned to other thread groups;
   if more cores are needed, selecting cores that are free and not currently assigned to any thread group; and
   if still more cores are needed, selecting cores that are free but have already been assigned to other thread groups;
   scheduling offloads within user processes to run on one of the coprocessors;
   binding threads of offloads to predetermined cores within one of the coprocessors by selecting and allocating cores to an offload, and obtaining an affinity setting from a user;
   applying an aging-based first-fit for process and offload scheduling; and
   applying thread and memory over-scheduling factors to enhance performance.

2. The method of claim 1, comprising applying greedy core selection such that offloads from the same process get preference to use the same cores.

3. The method of claim 1, wherein each coprocessor comprise a plurality of X86 cores running Linux, Peripheral Component Interconnect Express Interface, and memory controllers connected with a bidirectional Interprocessor Network (IPN) ring.

4. The method of claim 1, further comprising:
selecting and scheduling a pending process to a coprocessor with free memory; and
examining offload queues corresponding to each coprocessor, and dispatch an offload to each coprocessor with free threads,
wherein processes and offloads are selected based on an aging-based first-fit heuristic.

* * * * *